Figure 3:
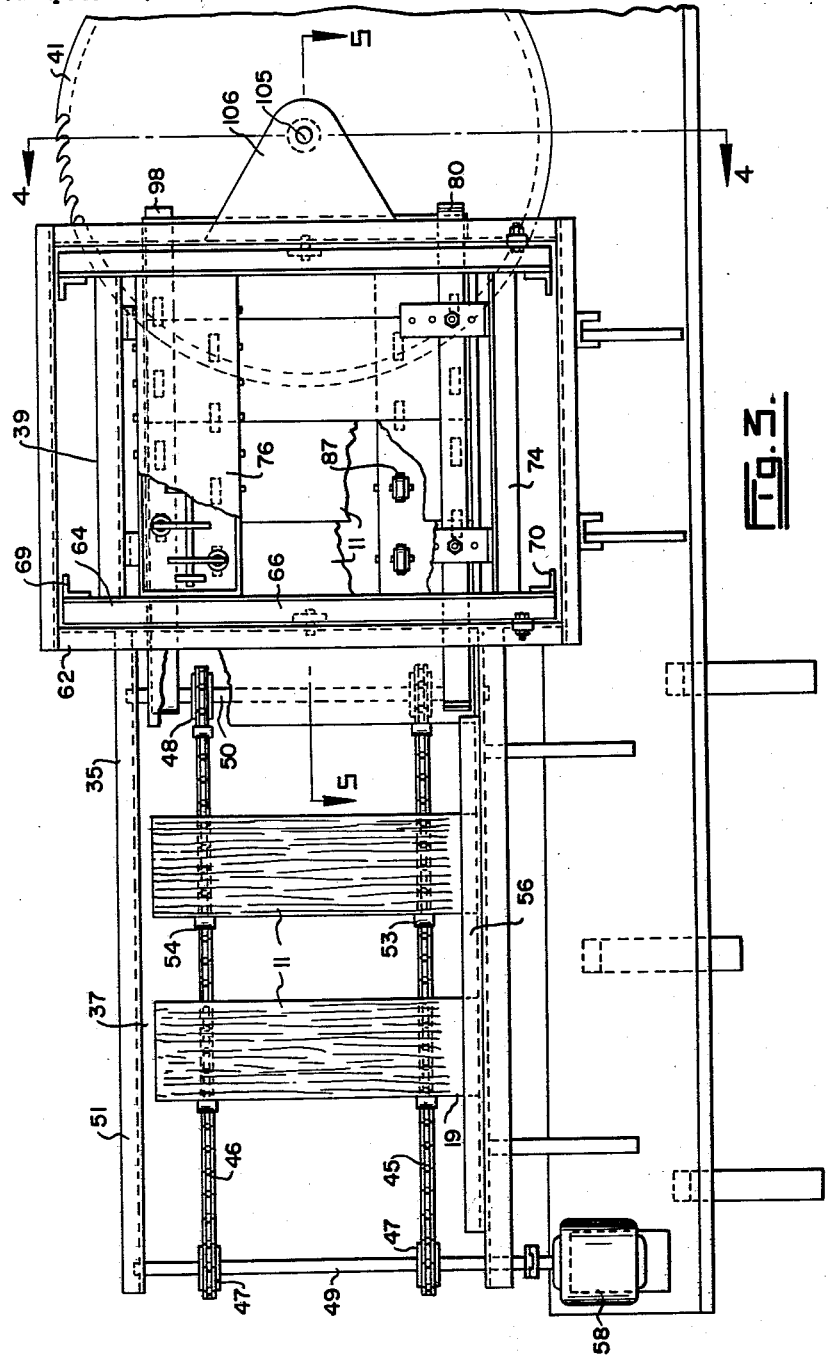

March 5, 1963
O. A. STARK
3,079,961
SHAKE SAWING MACHINE
Filed April 25, 1960
3 Sheets-Sheet 1
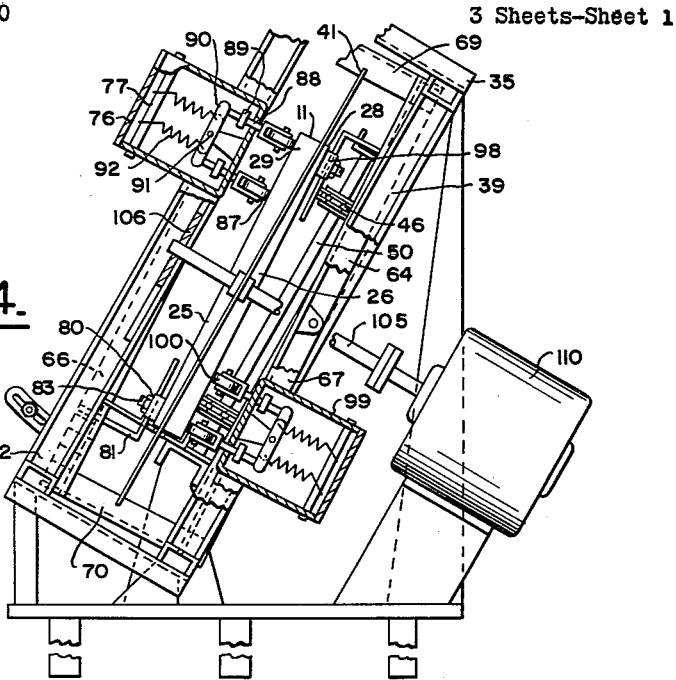
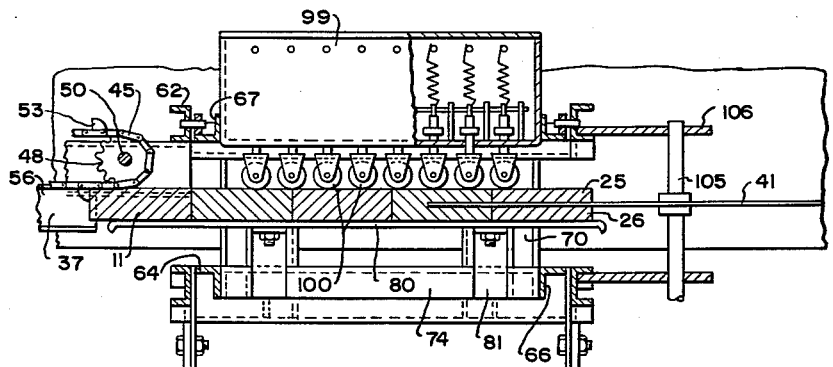
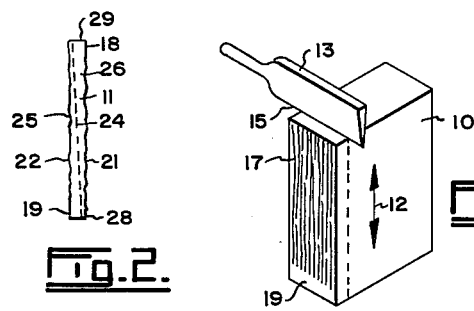
INVENTOR
ORLANDO A. STARK
BY
Featherstonhaugh & Co.
ATTORNEYS March 5, 1963 O. A. STARK 3,079,961
SHAKE SAWING MACHINE
Filed April 25, 1960 3 Sheets-Sheet 2

INVENTOR
ORLANDO A. STARK
BY
Fetherstonhaugh & Co.
ATTORNEYS

United States Patent Office 3,079,961
Patented Mar. 5, 1963

3,079,961
SHAKE SAWING MACHINE
Orlando A. Stark, Mission, British Columbia, Canada, assignor to Star Machinery Co., Ltd., Haney, British Columbia, Canada, a corporation of British Columbia
Filed Apr. 25, 1960, Ser. No. 24,430
11 Claims. (Cl. 143—8)

This invention relates to a machine for sawing shakes from blanks that have been split off wooden blocks.

Blanks for shakes are split from wooden blocks of the desired dimensions by means of a knife-like tool called a froe. The grain of the wood runs vertically in the block, and the froe is placed on the top of the block spaced inwardly from an edge thereof a distance equal to the desired thickness of the blank. The froe is hit with a sharp blow so that it enters the wood a short distance and causes the bank to split away from the block. The block is then turned over, and the next blank is split off it. As a result of this operation, each blank has a flat strip across a face at one end thereof which is caused by the froe entering the wooden block. The remainder of that face is uneven or is formed with longitudinal ridges therein because of the fact that the blank is split off the block. Each blank then has a flat strip across each of its opposite faces at the ends thereof, and the flat strip of one face is at the opposite end of the blank from that of the other face. Thus, the portion of each face that is opposite the flat strip of the other face is rough or uneven.

Prior to this invention, shake blanks have been cut between the faces thereof to form shakes by means of band saws. The shake blanks had to be fed to the saw by hand. Thus a man had to stand feeding the shake blanks one by one, thereby utilizing all of his time, and this was a dangerous operation.

An object of the present invention is the provision of a machine for sawing shakes which does not require a sawyer, thereby reducing the cost of production and eliminating the necessity of a man endangering his hands while feeding the blanks to the saw.

Another object of the present invention is to saw shake blanks in a very rapid and efficient manner.

Another object is the provision of a shake sawing machine employing a circular saw, eliminating the necessity of a more expensive band saw, and greatly reducing maintenance costs.

A shake sawing machine according to the present invention may utilize a band saw, but it is preferable to use a circular saw since better results are obtained, such saws are cheaper than band saws, and they are much easier and less expensive to maintain. This apparatus is designed to take advantage of the flat strips on the shake blanks to obtain shakes having tips of uniform thickness. Gauge plates are provided at the cutting edge of the saw on opposite sides of the cutting plane and substantially parallel therewith. These plates are positioned to bear against the flat strips at the opposite ends of the blanks. It is necessary to press the ends of each blank firmly against the gauge plates as the blank is fed to the saw. The difficulty is that the surfaces of the blank opposite the flat strips thereof are rough and uneven. This difficulty is overcome in the present machine by the provision of a guide head opposed to each gauge plate on the opposite side of the cutting plane thereto. Each guide head has at least one pressure bearing to press against the split-off or uneven face of the blank. Each bearing is loaded firmly to press the blank against the opposing gauge plate as the saw cuts through the blank. In the preferred form of the invention, the pressure bearings are in the form of spring-loaded rollers which turn in the direction of movements of the shakes so that they can ride over the rough surfaces of the blanks.

Figure 6:
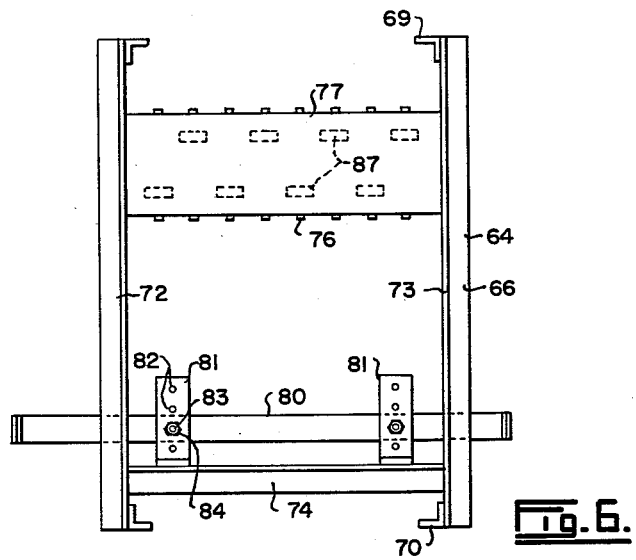
Figure 7:
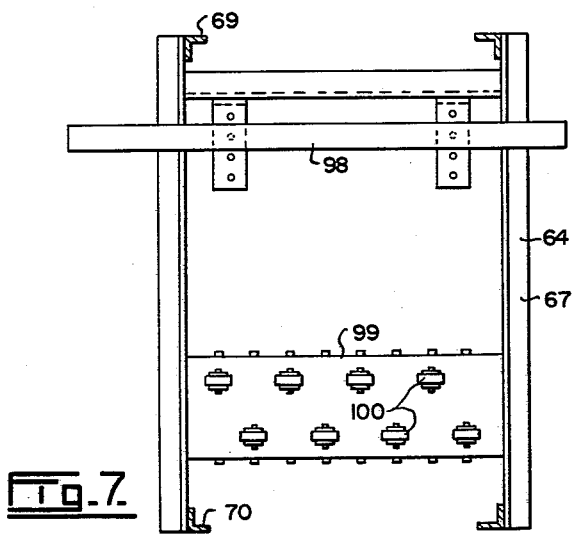

A preferred form of shake sawing machine is illustrated in the accompanying drawings, in which, FIGURE 1 is a perspective view of a wooden block from which shake blanks are split, showing a froe in splitting position, FIGURE 2 is an end elevation of a shake blank split from the block, FIGURE 3 is a side elevation of the major portion of the shake sawing machine, FIGURE 4 (sheet 1) is a vertical section taken on the line 4—4 of FIGURE 3, showing the saw in section and most of the rest of the apparatus in end elevation, FIGURE 5 is a horizontal sectional view taken on the line 5—5 of FIGURE 3, FIGURE 6 (Sheet 3) is an outer view of one side of a sub frame alone of the machine, and FIGURE 7 is an inner view of the opposite side of the sub frame alone.

Referring in FIGURES 1 and 2 of the drawings, 10 is a block of wood, usually cedar, from which shake blanks 11 are split. The grain of the block runs vertically thereof, as indicated by arrow 12 in FIGURE 1. A froe 13 is used for splitting off the shake blanks, said froe having a blade 15 which is substantially wedge-shaped in cross section. The froe is placed on top of block 10 spaced inwardly of the edge 17 thereof a distance equal to the desired thickness of the blank. The froe then is hit a sharp blow which drives it down into the block a short distance, at which time the blank then splits off the block. The wood where the froe has entered the block is smooth so that the shake blank has flat strips 18 and 19 across faces 21 and 22 thereof, the flat strip 18 being at the opposite end of the blank from strip 19, as clearly shown in FIGURE 2. The remainder of the faces 21 and 22 are comparatively rough because of the fact that the blank has been split away from block 10.

Each blank 11 is fed edgewise to a saw so that it is cut between the faces 21 and 22 thereof along a line indicated at 24 in FIGURE 2 to produce shakes 25 and 26. This line is usually inclined to the faces of the blank in order to form tips 28 and butts 29 at the opposite ends of the blank.

FIGURES 3 to 5 illustrate a preferred form of shake sawing machine 35. It has been found desirable to incline the machine to the vertical, as clearing shown in FIGURE 4, but it will be understood that the machine may be in positions anywhere from the vertical to the horizontal.

The sawing machine 35 generally includes a feeding section 37, holding section 39, and a power-driven circular saw 41 that extends into the holding section.

The feeding section 37 of the machine includes feeding means for moving shake blanks 11 edgewise to saw 41 substantially in the cutting plane of the latter. In this example, saw blade 41 is inclined to the vertical so that the feeding means is constructed to move blanks 11 in a correspondingly-inclined plane. Any desired means for positively moving the blanks edgewise may be used. For example, a pair of endless chains 45 and 46 extend around pairs of sprockets 47 and 48 fixedly mounted on shafts 49 and 50 which are journalled in suitable bearings in a frame 51. Chains 45 and 46 have lugs 53 and 54 projecting outwardly therefrom for engaging blanks 11 and moving them towards saw 41. The lower ends of the blanks rest on a guide bar 56 that extends towards the saw. Suitable means is provided for driving chains 45—46, and this may be an electric motor 58 connected to an end of shaft 49.

Holding section 39 includes a box-like open frame 62 which lies at the same angle to the vertical as feeding section frame 51. A sub frame 64 is mounted within and carried by frame 62. The sub frame is box-like and open, and preferably is adjustably mounted within frame 62 so that the angle of the sub frame may be varied relative to the outer frame. Actually, frame 64 lies at an angle to the vertical, but at a different angle from that of outer frame 62, see FIGURE 4.

Sub frame 64 is made up of spaced identical sides 66 and 67, see FIGURES 6 and 7, connected at the tops and bottoms thereof by cross braces 69 and 70.

Side 66 includes spaced side members 72 and 73 connected together near the lower ends thereof by a bar 74. These side members are connected near their upper ends by a guide head 76. This guide head is in the form of a plate having a box 77 removably mounted on the outer surface thereof.

A long narrow flat gauge plate 80 is adjustably mounted on bar 74 inwardly of side members 72 and 73 in any convenient manner. In this example, brackets 81 are mounted on bar 74 and project upwardly therefrom, each bracket having a plurality of holes 83 therein. Threaded studs 83 project outwardly from gauge plate 80 and extend through holes 82 of brackets 81 and are connected to the latter by nuts 84. With this arrangement, plate 80 can be adjusted up and down within sub frame 64. Furthermore, the gauge plate may be adjusted in and out relative to the frame.

If desired, guide head 76 may be adjustably connected to side members 72 and 73, but it has been shown fixedly connected thereto in the drawings. The guide head is relatively wide as compared to the width of gauge plate 80 and adjustment is not so necessary for the former. One or more pressure bearings is or are carried by guide head 76. It is preferable to have a plurality of these bearings, and they are preferably in the form of individually-mounted rollers or wheels 87. Each roller is mounted on the end of a stem 88 which slidably extends through head 76 into box 77, see FIGURE 4. A stop 89 on the stem limits the outer movement of the latter relative to the guide head. The upper end of each stem bears against a rocker arm 90 mounted on a common shaft 91, the opposite end of said rocker arm being connected to one end of a tension spring 92, the opposite end of which is anchored in box 77. The springs 92 urge rollers 87 outwardly of head 76.

Side 67 of sub frame 64 is the same as side 66, and carries a gauge plate 98 and a guide 99. Plate 98 is adjustable on the side, and guide head includes a plurality of individually-mounted bearings in the form of rollers or wheels 100. There is one difference between side 67 and its associated elements and side 66 with its associated elements, and that is that gauge plate 98 is opposed to guide head 76, while gauge plate 80 is opposed to guide head 99.

Saw 41 is preferably in the form of a circular saw which is mounted on an arbor 105 journalled in brackets 106 projecting outwardly from the side of frame 62. It will be noted that arbor 106 is spaced outwardly from the ends of gauge plates 80 and 98, and guide heads 76 and 99 in a direction away from the feeding section 37. Saw 41 is substantially in the plane of the feeding means 45—46 of the feeding section, but is inclined relative to the general position of sub frame 64, as clearly shown in FIGURE 4, said saw extending inwardly of the sub frame between the gauge plates and their respective guide heads. The saw is connected to a suitable source of power, such as an electric motor 110, the drive shaft of said motor being coupled to arbor 105.

The sawing machine 35 carries out its sawing operating automatically so that no one has to endanger himself by handling shake blanks near the cutting blade. Shake blanks 11 are manually or automatically supplied to the conveyor chains 45 and 46. The lower ends of these shakes rest against guide bar 56, and they are moved edgewise in the direction of saw 41 by the chain lugs 53 and 54. When each blank reaches the inner end of the conveyor formed by the chains 45—46, they are directed between gauge plates 80 and 98 and their opposed guide heads 99 and 76, respectively. The shake blanks are directed to the conveying means so that their flat strips 19 and 18 bear against gauge plates 80 and 98 respectively. These plates are positioned so that they touch only the flat strips of the blanks, and not the uneven surfaces thereof. These uneven surfaces are engaged by the bearing rollers 87 and 100. The blanks have to be firmly gripped during the sawing operation, and the plurality of individually loaded bearing rollers makes this possible. The rollers ride over the uneven surfaces of the shake blanks so that they at all times press the blanks firmly against the opposing gauge plates 80 and 98. The positions of these gauge plates relative to saw 41 determines the thickness of the tips 28 of the finished shakes. These plates may be adjusted towards and away from the saw in order to produce tips of desired thicknesses. The pressure of the rollers against the blanks is sufficient to flatten out any warped blanks.

The shake blanks 11 are moved between the gauge plates and guide head by the blanks which are being moved into the space between these elements by the conveying means 45—46. In this way the blanks are advanced edgewise until they are sawn between the faces thereof by saw 41, as clearly shown in FIGURES 3 to 5. The continuous movement of the blanks in the direction of the saw forces the cut shakes out from between the gauge plates and guide heads so that they drop downwardly out of the machine. Arbor 105 is spaced outwardly relative to sub frame 64 sufficiently to permit this to take place.

If shorter shakes are required, shorter blanks will be used, and gauge plate 98 shifted downwardly in the side 67 of sub frame 64, guide head 76 being wide enough to permit this while still being in position for proper operation. If still shorter shakes are required, gauge plate 80 may be shifted upwardly, in which case, guide bar 56 would also have to be shifted upwardly.

What I claim as my invention is:

1. A machine for sawing shakes from wooden shake blanks that have been split off blocks so that each blank has a flat strip across a face at an end thereof, the flat strip of each face being at the opposite end of the blank from that of the other face, comprising a power driven saw, means feeding shake blanks edgewise to the saw substantially in the cutting plane of the latter, said saw cutting through each blank between the faces thereof to form two shakes, gauge plates at the cutting edge of the saw on opposite sides of the cutting plane substantially parallel therewith and positioned to bear against the flat strips at the opposite ends of the blanks, and a guide head opposed to each gauge plate on the opposite side of the cutting plane thereto, each guide head having a plurality of individual roller wheels independently resiliently urged towards the opposing plate to press against the uneven split-off faces of the blanks firmly to press said blanks against the opposing plate as the saw cuts through the blanks.

2. A shake sawing machine as claimed in claim 1 in which the feeding means is positioned to feed the blanks to the saw at an angle to the cutting plane to produce shakes having thin tips of one end and butts at the opposite end thereof.

3. A shake sawing machine as claimed in claim 1 in which the surfaces of the gauge plates facing the cutting plane are flat.

4. A shake sawing machine as claimed in claim 1 in which each gauge plate is mounted for adjustment towards and away from the saw cutting plane.

5. A shake sawing machine as claimed in claim 1 in which the saw is a circular saw mounted on an arbor, the distance from the cutting edge of the saw to the arbor being greater than the width in the direction of travel of the shake blanks.

6. A shake sawing machine as claimed in claim 1 in which the feeding means, saw, gauge plates and guide heads are inclined to the vertical, and including guide means extending along the feed means to the saw upon which lower edges of the blanks move, said guide means terminating at the cutting edge of the saw to permit the cut shakes to drop downwardly as they clear the guide means.

7. A shake sawing machine as claimed in claim 1 in which the gauge plates and guide heads are mounted on a common frame tiltably mounted relative to the saw and the cutting plane thereof, said frame being movable to adjust the tip thickness of the shakes between the saw and the gauge plates.

8. In a machine for sawing shakes from wooden shake blanks, a power driven saw, means feeding shake blanks edgewise to the saw substantially in the cutting plane of the latter, said saw cutting through each blank between the faces thereof to form two shakes, a gauge plate at the cutting edge of the saw spaced from and substantially parallel with the cutting plane of said saw and positioned to bear against each blank being cut by the saw near an end of said blank, a guide head opposed to the gauge plate on the opposite side of the cutting plane thereto, and a plurality of closely spaced individually and resiliently loaded bearings carried by the guide head and positioned to press each blank against the opposed gauge plate as the saw cuts therethrough, said bearings being spaced apart in the direction of movement of the blanks.

9. A shake sawing machine as claimed in claim 8 in which each pressure bearing is a roller positioned to roll in the direction of movement of the shake blanks.

10. A machine for sawing shakes from wooden shake blanks comprising a power driven saw, means feeding shake blanks edgewise to the saw substantially in the cutting plane of the latter, said saw cutting through each blank between the faces thereof to form two shakes, gauge plates at the cutting edge of the saw on opposite sides of the cutting plane substantially parallel therewith and positioned to bear against the blanks being cut by the saw near the opposite ends of said blanks, a guide head opposed to each gauge plate on the opposite side of the cutting plane thereto, and a plurality of closely spaced individually and resiliently loaded bearings carried by each guide head and positioned to press the blanks against the opposed gauge plates as the saw cuts therethrough, the bearings of each head being spaced apart in the direction of movement of the blanks.

11. A shake sawing machine as claimed in claim 10 in which each pressure bearing of each head is a roller positioned to roll in the direction of movement of the shake blanks.

References Cited in the file of this patent

UNITED STATES PATENTS

| | | |
|---|---|---|
| 13,354 | Hull | July 31, 1855 |
| 292,107 | Dake et al. | Jan. 15, 1884 |
| 1,805,906 | Dennis | May 19, 1931 |
| 1,849,439 | Smith | Mar. 15, 1932 |
| 1,895,016 | Whiting | Jan. 24, 1933 |
| 1,959,475 | Hutchings | May 22, 1934 |
| 2,783,796 | Patterson | Mar. 5, 1957 |
| 2,936,800 | Eschenburg et al. | May 17, 1960 |

FOREIGN PATENTS

| | | |
|---|---|---|
| 495 of 1882 | Great Britain | Feb. 1, 1882 |